United States Patent
Dimou et al.

(10) Patent No.: US 8,837,290 B2
(45) Date of Patent: Sep. 16, 2014

(54) HANDOVER IN A SOFT CELL NETWORK

(71) Applicant: Telefonaktiebolaget L M Ericsson (PUBL.), Stockholm (SE)

(72) Inventors: Konstantinos Dimou, Stockholm (SE); Stefano Sorrentino, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 92 days.

(21) Appl. No.: 13/705,007

(22) Filed: Dec. 4, 2012

(65) Prior Publication Data

US 2014/0153545 A1 Jun. 5, 2014

(51) Int. Cl.
*H04L 12/28* (2006.01)
*H04W 4/00* (2009.01)
*H04W 36/00* (2009.01)
*H04W 72/00* (2009.01)
*H04W 36/30* (2009.01)

(52) U.S. Cl.
CPC ................................. *H04W 36/30* (2013.01)
USPC ... 370/235; 370/332; 370/395.21; 455/432.1; 455/436; 455/452.2

(58) Field of Classification Search
CPC ..... H04W 24/02; H04W 28/00; H04W 28/02; H04W 28/08; H04W 48/20; H04W 72/00; H04W 72/04; H04W 72/1231; H04W 88/06; H04W 88/08; H04W 92/20; H04W 36/00; H04W 36/0011; H04W 36/0016; H04W 36/0022; H04W 36/0044; H04W 36/0066; H04W 36/0072; H04W 36/04; H04W 36/08; H04W 36/14; H04W 36/16; H04W 36/22; H04W 36/24; H04W 36/30; H04W 36/165; H04L 41/0893; H04L 41/5003; H04L 41/5025; H04L 63/10; H04L 47/125; H04B 17/0042; H04B 17/0067; H04B 17/0077; H04B 7/022; H04M 15/58; H04M 15/0188
USPC .......... 370/229–238, 310–350, 395.2–395.6, 370/400–401, 439, 449; 455/422.1–430, 455/431–444, 446–456.5, 464–466
See application file for complete search history.

(56) References Cited

U.S. PATENT DOCUMENTS

| | | | |
|---|---|---|---|
| 2011/0275377 A1* | 11/2011 | Wu et al. ........................ | 455/436 |
| 2012/0230293 A1* | 9/2012 | Grinshpun et al. ........... | 370/331 |
| 2012/0302240 A1* | 11/2012 | Tamaki et al. ................ | 455/436 |
| 2013/0165130 A1* | 6/2013 | Wu et al. ........................ | 455/444 |
| 2014/0004863 A1* | 1/2014 | Zhang et al. .................. | 455/444 |
| 2014/0029580 A1* | 1/2014 | Jung et al. ..................... | 370/331 |
| 2014/0092866 A1* | 4/2014 | Teyeb et al. ................... | 370/331 |

OTHER PUBLICATIONS

International Search Report and the Written Opinion of the International Searching Authority dated Feb. 28, 2014, in International Application No. PCT/IB2013/060579, 12 pages.

(Continued)

*Primary Examiner* — Tri H Phan
(74) *Attorney, Agent, or Firm* — Rothwell, Figg, Ernst & Manbeck, P.C.

(57) ABSTRACT

Devices and methods for making a determination whether or not to handover a user equipment (UE) from a serving cell to a target cell are disclosed. The decision is based on a comparison that includes both control plane and data plane link quality considerations. The disclosed devices and methods may be applied to handover determinations in heterogeneous networks that implement a soft cell configuration.

43 Claims, 9 Drawing Sheets

(56) References Cited

OTHER PUBLICATIONS

Ishii et al. "A Novel Architecture for LTE-B: C-plane/U-plane Split and Phantom Cell Concept" IEEE, 2012, pp. 624-630.

Huawei et al "RRM measurements on CSI-RS" 3GPP TSG RAN WG1 Meeting #67, R1-113644, 2011, 2 pages.

Zhang "A User Mobility Analysis Assistive MRO Algorithm for Handover Parameters Optimization in LTE SON System" Wireless Advanced (WiAd), 2012, pp. 143-148.

* cited by examiner

HANDOVER IN A SOFT CELL NETWORK

TECHNICAL FIELD

The present invention relates generally to improving transmission quality in telecommunication networks and, more particularly, to methods and devices for handover decisions in a heterogeneous network.

BACKGROUND

3GPP Long Term Evolution (LTE) is a standard for mobile phone network technology. LTE is a set of enhancements to the Universal Mobile Telecommunications System (UMTS), and is a technology for realizing high-speed packet-based communication that can reach high data rates on both downlink and uplink channels. As illustrated in FIG. 1, LTE transmissions are sent from base stations 102,104, such as Node Bs (NBs) and evolved Node Bs (eNBs) in a telecommunication network 100, to mobile stations 108, 110, 112 (e.g., user equipment (UEs)). Examples of wireless UE communication devices include mobile telephones, personal digital assistants, electronic readers, portable electronic tablets, personal computers, and laptop computers. The UEs operate within serving cells 116, 118 corresponding to nodes 102, 104, respectively. The communication network 100 may include one or more connecting networks 106.

The LTE standard is primarily based on Orthogonal Frequency Division Multiplexing (OFDM) in the downlink, which splits the signal into multiple parallel sub-carriers in frequency. A transmit time interval (TTI) is the basic logical unit, which is comprised of a pair of sub-frames (or resource blocks). A radio resource element (RE) is the smallest addressable location within a TTI, corresponding to a certain time location and a certain frequency location. For instance, as illustrated in FIG. 2, a sub-frame 200 comprised of REs 202, 204 may be transmitted in a TTI in accordance with the LTE standard, and may consist of sub-carriers 206 in the frequency domain. In the time domain, the sub-frame may be divided into a number of OFDM (or Single Carrier Frequency Domain Multiple Access (SC-FDMA)) symbols 208. Thus, the unit of one sub-carrier and one symbol is a resource unit or element 202, 204.

Certain wireless communication systems, such as the system 100 shown in FIG. 1, may also include additional lower-power nodes or points 114, 124 within macro cells 116, 118. This may be referred to as a "heterogeneous" or "multi-layered" network deployment, wherein a mixture of nodes with different downlink transmission power, operate on (at least partially) the same set of frequencies and with overlapping geographic coverage. In a heterogeneous deployment, the low power nodes may not provide full coverage, but rather, may be deployed to improve capacity and data rates within their limited coverage areas, such as coverage area 120 and 122 of nodes 114 and 124 respectively. Node 114 and coverage area 120 may be a pico site of macro-cell 116. Similarly, node 124 may be a femto node, that may be employed for instance in a home, office building, or other structure. In some instances, node 124 may be associated with a Closed Subscriber Group (CSG) and limit access to members of the CSG.

A recent development with respect to heterogeneous deployments is the concept of "soft cell" (or "shared cell," or "phantom cell") schemes. In a soft cell deployment, an operator controls macro base stations and low power nodes in the same geographic area 116 such that control signaling is transmitted to users in the area via the macro base station 102 and data is transmitted via one or more lower power nodes, such as pico base station 114, for users 110 located in the coverage area 120 of the lower power node. In a soft cell configuration, the lower power nodes remain a part of the macro cell 116 rather than creating independent cells with, for instance, unique control signaling.

In order to maintain the highest possible quality of service, UEs in an LTE deployment periodically monitor not only the link quality to their serving cell, but also the link quality to neighboring cells. For instance, in the example network 100 of FIG. 1, UE 110 may consider both the quality of a link to base station 102 as wells as base station 104. If the serving cell 116 transmission quality is insufficient (e.g., certain metrics fail to meet required threshold levels), a handover to neighboring cell 118 may be initiated. A handover procedure may be categorized based on packet loss, for instance, it may be labeled "seamless" if it minimizes interference time, or "lossless" if the procedure does not tolerate any loss of packets.

As specified in 3GPP 36.331, version 10.5.0, handover may be executed based on the following comparison:

$$RSRP_{Target} > RSRP_{Serving} + HO_{Hysteresis} + CellOffset \qquad (1)$$

where the terms $RSRP_{Target}$ and $RSRP_{Serving}$ refer to the Reference Symbol Received Power (RSRP) measurements from the target cell 118 and serving cell 116, respectively, in the network 100 of FIG. 1. The RSRP measurements in Equation (1) are determined from reference symbols transmitted from base stations 102, 104 and reported by the UE back to the serving base station. This equation has to be satisfied during a given period Time to Trigger (TTT) in order for handover from the serving cell to the target cell to be executed. Values for the parameters CellOffset, margin hysteresis $HO_{Hysteresis}$, and TTT are set to control the ease/difficulty of handoff to or from a given cell and are typically the same for all users within a given cell. However, the LTE standard allows for independently setting handover trigger parameters on a per-UE basis. Exemplary values for a network in a large urban European area are 1-3 dB for $HO_{Hysteresis}$ and 320-960 ms for TTT. Equation (1) corresponds to the event A3 specified in §5.5.4 of 36.331, version 10.5.0., and is the criterion largely used in existing systems.

In a soft cell deployment, a UE 110 is formally associated with the macro cell 116, and thus, handover decisions are done on the basis of signals received by the UE 110 from the macro base stations 102, 104. In other words, if the existing handover procedures are applied to a "soft cell," only measurements on the macro layer are taken into account for handover decisions.

Therefore, despite the existence of current protocols related to handover decision mechanisms, there remains a need for devices and methods that can address the potential discrepancy between the link quality on the control plane and the user (or data) plane. This discrepancy frequently arises in a heterogeneous network featuring the soft cell concept. When the quality experienced at the data plane (i.e., the signal received from the pico base station) is higher than the quality received at the control plane (i.e., the signal received from the macro base station), existing techniques will fail to make the optimal handover decision.

SUMMARY

According to embodiments of the present invention, the quality of service in a communication network is improved by considering the link quality of both the control plane and the data plane in handover decisions. The disclosed techniques are particularly useful in heterogeneous networks featuring the soft cell concept.

In one particular aspect, certain embodiments of the present invention are directed to a method for improving the quality of service in a communication network having a serving cell and a target cell is provided. The method includes receiving, at a first network node, a serving cell control plane value that indicates the control plane link quality between a user equipment (UE) and the serving cell. The first network node also receives a serving cell data plane value that indicates a data plane link quality between the UE and the serving cell, a target cell control plane value that indicates a control plane link quality between the UE and a target cell detected by the UE, and a target cell data plane value that indicates a data plane link quality between the UE and the target cell. The target cell control plane value and the target cell data plane value are based, at least in part, on transmission from one or more target network nodes in the target cell. The serving cell control plane value may be based, at least in part, on transmissions from the first network node.

The method also includes comparing the serving cell control plane value and the serving cell data plane value to the target cell control plane value and the target cell data plane value. Based on this comparison, a handoff from the serving cell to the target cell may be initiated.

In another aspect, certain embodiments of the present invention are directed to a network node operable in a communication network having a serving cell and a target cell. The network node includes a receiver configured to receive a serving cell control plane value indicating a control plane link quality between a UE and the serving cell, a serving cell data plane value indicating a data plane link quality between the UE and the serving cell, a target cell control plane value indicating a control plane link quality between the UE and a target cell detected by the UE, and a target cell data plane value indicating a data plane link quality between the UE and the target cell. The target cell control plane value and the target cell data plane value are based, at least in part, on transmissions from one or more target network nodes in the target cell and the network node is located within the serving cell.

The network node also includes a processor that is configured to compare the serving cell control plane value and serving cell data plane value to the target cell control plane value and target cell data plane value. The processor is further configured to, based at least in part on the comparison, initiate a handoff of the UE.

In another aspect, certain embodiments of the present invention are directed to a method for improving the quality of service in a communication network having a serving cell and a target cell is provided. The method includes receiving, at a first network node, a serving cell control plane downlink value that indicates the downlink control plane link quality between a UE and the serving cell. The first network node also receives a serving cell data plane uplink value that indicates an uplink data plane link quality between the UE and the serving cell, a target cell control plane downlink value that indicates a downlink control plane link quality between the UE and a target cell detected by the UE, and a target cell data plane uplink value that indicates an uplink data plane link quality between the UE and the target cell.

In certain embodiments, the serving cell data plane uplink value is received from a second network node in the serving cell and the target cell data plane uplink value is received from one or more target network nodes in the target cell. The target cell control plane downlink value may be based, at least in part, on transmissions from the target network nodes in the target cell. The serving cell control plane downlink value may be based, at least in part, on transmissions from the first network node.

The method also includes comparing the serving cell control plane downlink value and the serving cell data plane uplink value to the target cell control plane downlink value and the target cell data plane uplink value. Based on this comparison, a handoff from the serving cell to the target cell may be initiated.

In another aspect, certain embodiments of the present invention are directed to a network node operable in a communication network having a serving cell and a target cell. The network node includes a receiver configured to receive a serving cell control plane downlink value indicating a downlink control plane link quality between a UE and the serving cell, a serving cell data plane uplink value indicating an uplink data plane link quality between the UE and the serving cell, a target cell control plane downlink value indicating a downlink control plane link quality between the UE and a target cell detected by the UE, and a target cell data plane uplink value indicating an uplink data plane link quality between the UE and the target cell.

In certain embodiments, the network node is located in the serving cell and the serving cell data plane uplink value is received from a second network node in the serving cell. The target cell data plane uplink value may be received from one or more target network nodes in the target cell. The target cell control plane downlink value may be based, at least in part, on transmissions from the target network nodes in the target cell. The serving cell control plane downlink value may be based, at least in part, on transmissions from the network node.

The network node also includes a processor that is configured to compare the serving cell control plane value and serving cell data plane value to the target cell control plane value and target cell data plane value. The processor is further configured to, based at least in part on the comparison, initiate a handoff of the UE.

In certain embodiments, a node in a communication network transmits signals to a UE located with\in a serving cell of the node. The node receives values that indicate the control plane and data plane link quality between the UE and the serving cell. These values may be received, for instance, from the UE. The node also receives values that indicate the control plane and data plane link quality between the UE and a neighboring target cell. In certain aspects, a determination is made as to whether the serving cell control plane value meets or exceeds a given threshold level. If not, a handoff is initiated from the serving cell to a neighboring cell, such as the target cell. However, if the serving cell control plane link quality is determined to be sufficient, the node compares the serving cell control plane value and the serving cell data plane value to the target cell control plane value and the target cell data plane value. If a predetermined handoff condition is satisfied, such as the target cell values exceeding the serving cell values by a certain amount, a handoff is initiated to the target cell. The node may be, for instance, a macro base station in a heterogeneous network and the serving cell data plane value may indicate the link quality to one or more pico nodes within the serving cell.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Figure 1:
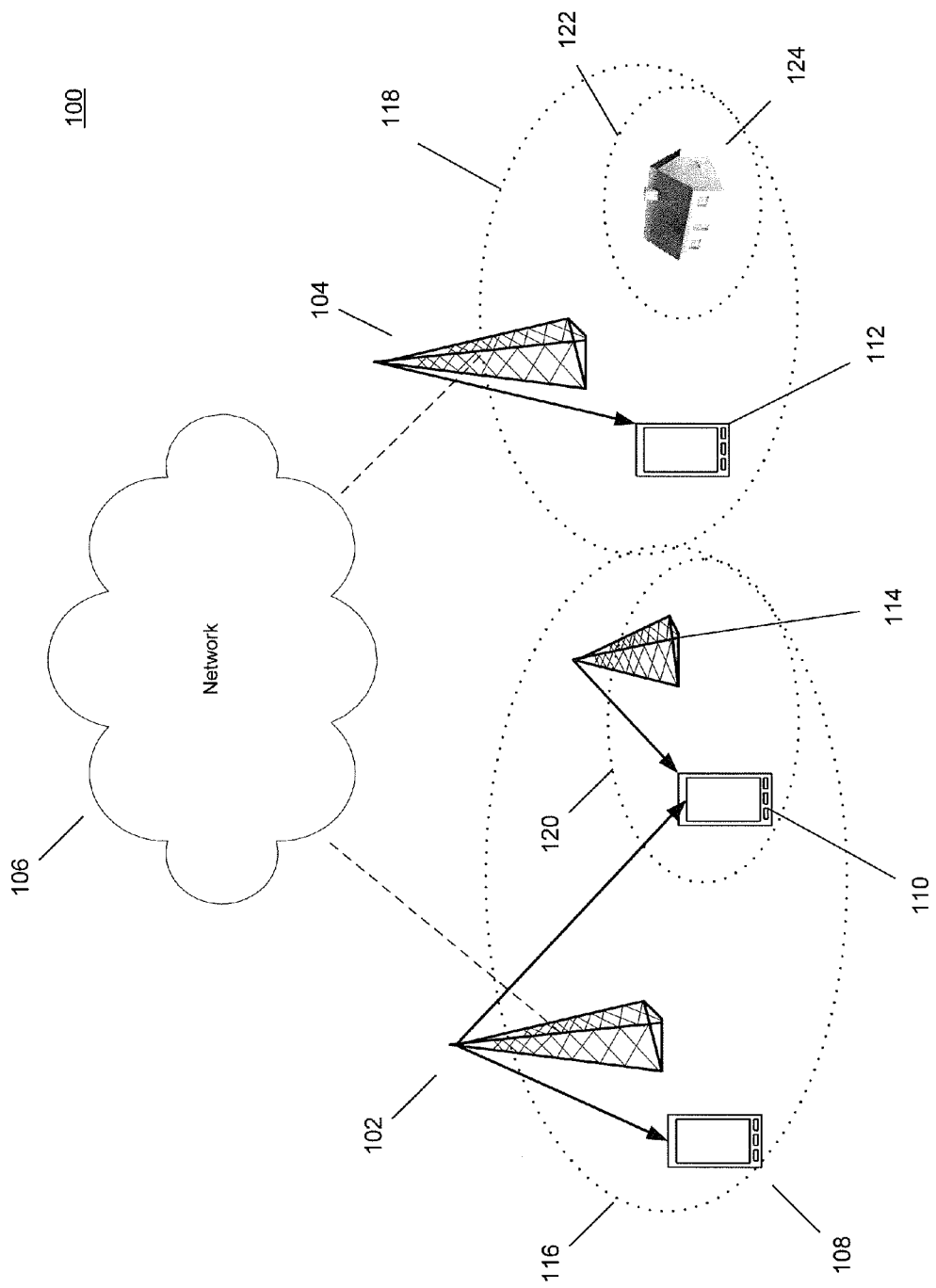
FIG. 1 is an illustration of a wireless communication network.
Figure 2:
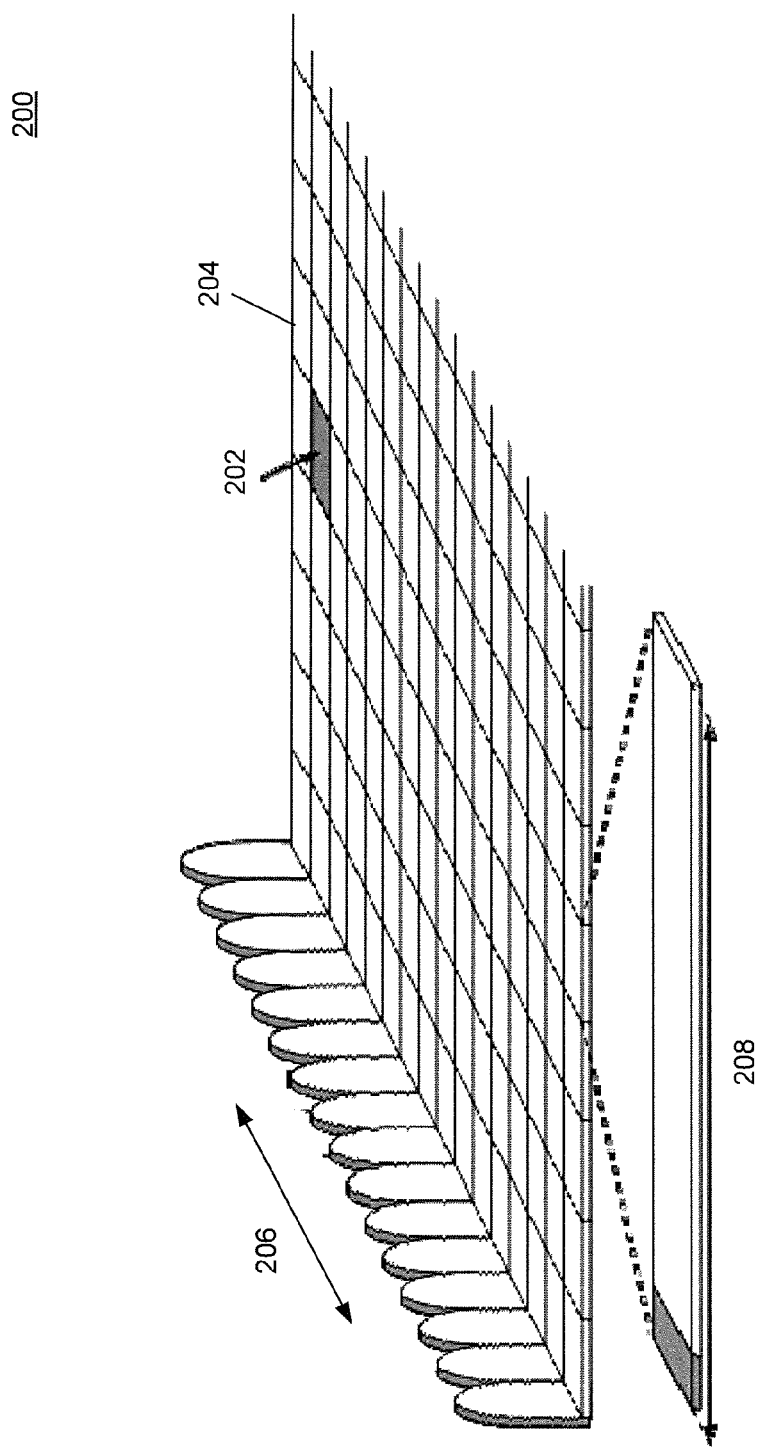
FIG. 2 is an illustration of an exemplary sub-frame of an LTE transmission.

Particular embodiments of the present invention are directed to methods and devices for making a determination whether or not to initiate a handoff of a user equipment (UE) from a serving cell to a target cell based on a comparison that includes both control plane and data plane link quality considerations. Aspects of the present invention may be applied to handover determinations in heterogeneous networks, such as the exemplary communication network 300 illustrated in FIG. 3. The network 300 may, for instance, utilize a soft cell concept wherein control signaling is transmitted to UE 310 in serving cell 312 via the macro base station 302, while data is transmitted via one or more lower power nodes, such as pico base station 308, when UE 310 is located in the coverage area 316 of low power node 308.

Communication network 300 also includes at least one additional cell 314, which is served by macro base station 304. In accordance with the LTE specification, under certain circumstance, UE 310 may be handed over from its current or serving cell 312, to another destination or target cell, such as 314 in order to provide optimal service to UE 310. In accordance with embodiments of the present invention, in order to improve performance in the heterogeneous network 300, the handover decision is based upon consideration of both the link quality in the control plane as well as the data plane. For instance, the decision to handover UE 310 from serving cell 312 to target cell 314 may be based on consideration of the link quality in the control plane between UE 310 and node 302 and the data plane link quality between UE 310 and node 308, as compared to the link quality in the control plane and data plane between UE 310 and target node 304.

Numerous reference signals and reports may be utilized in establishing the link quality between UE 310 and nodes 302, 304, and/or 308. These include references signals such as common reference signals (CRS), channel state information reference signals (CSI-RS), demodulation reference signals (DM-RS), synchronization signals such as Primary Synchronization Signals (PSS) and Secondary Synchronization Signals (SSS), uplink sounding reference signals (SRS), and measurements and reports such as Reference Signal Received Power (RSRP), received signal reference quality (RSRQ), and channel quality indicator (CQI) or any channel state information. The individual nodes, UEs, and background systems (e.g., a radio network controller) or other devices in the backend network utilize these mechanisms such that information regarding both the control plane and data plane may be exploited when making a handover decision.

Figure 3:
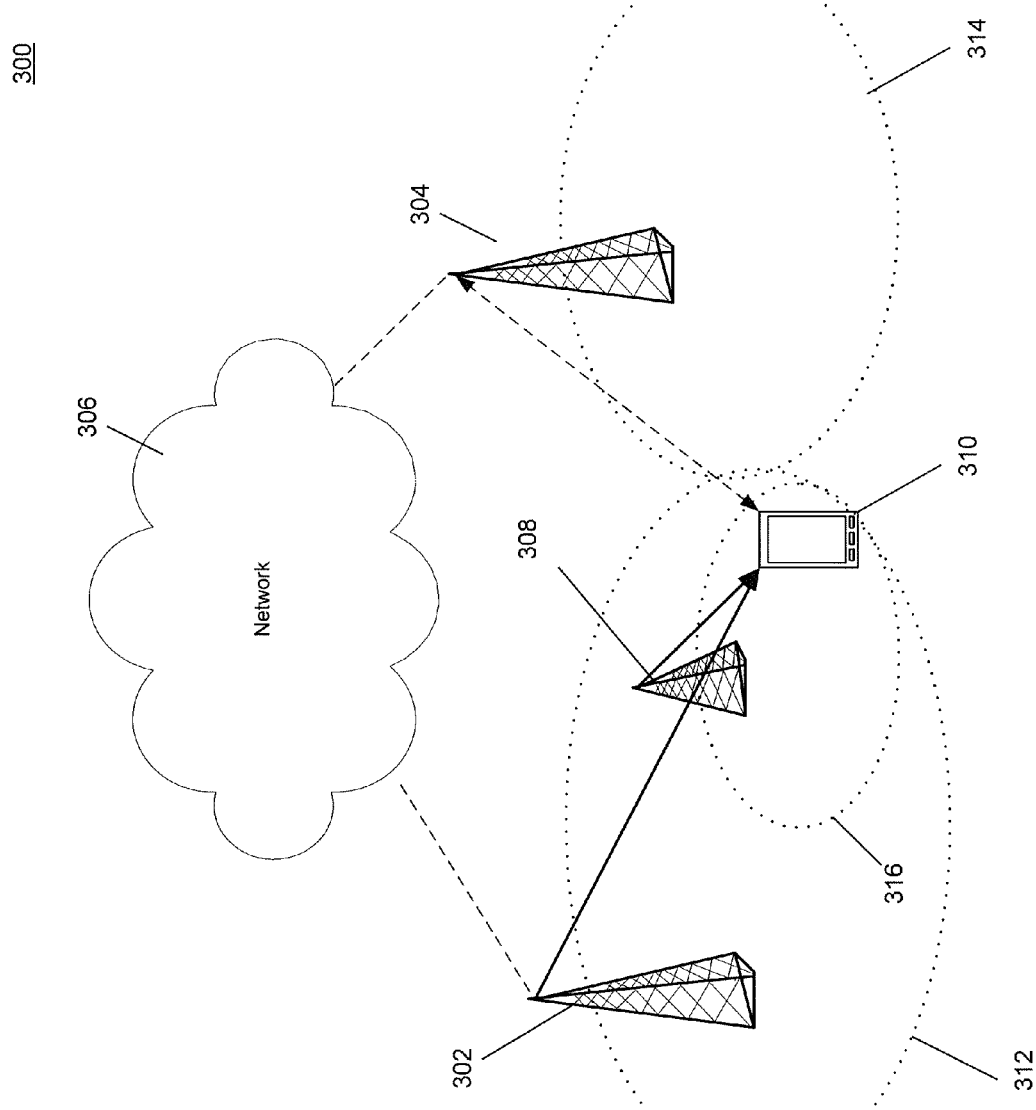
FIG. 3 is an illustration of a wireless communication system in accordance with exemplary embodiments of the present invention.
Figure 4:
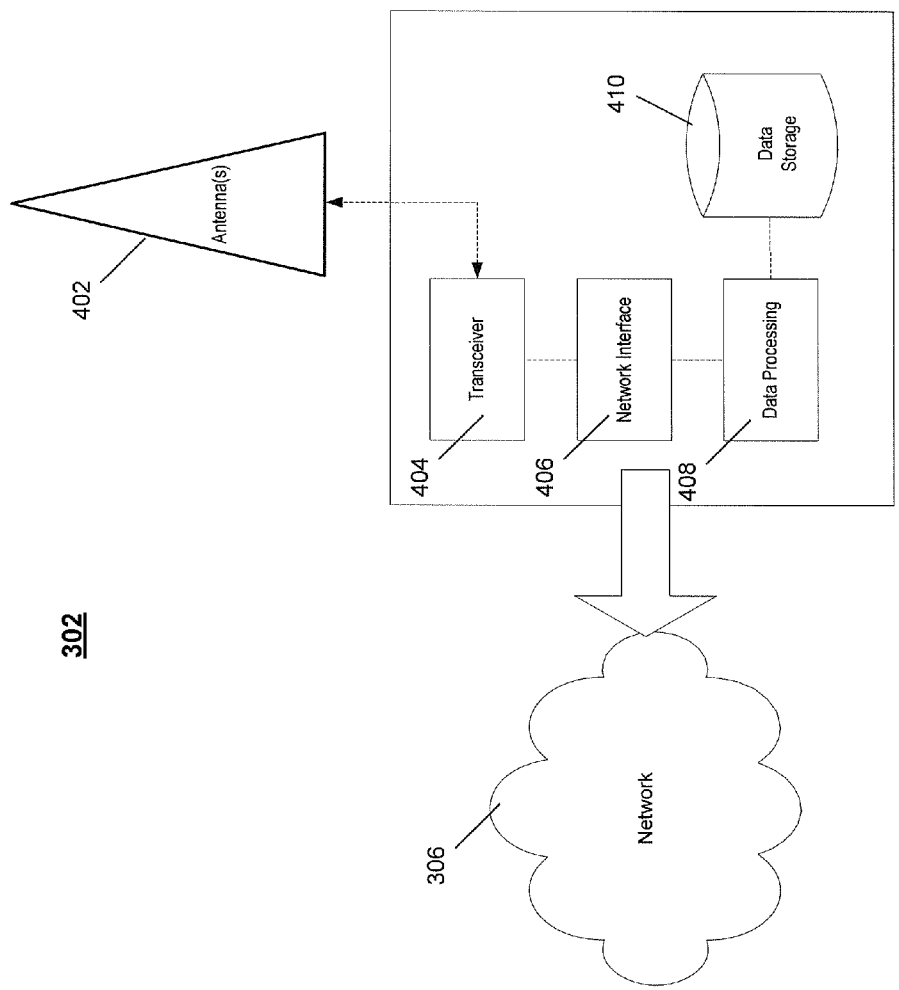
FIG. 4 is a block diagram of a network node in accordance with exemplary embodiments of the present invention.

FIG. 4 illustrates a block diagram of an exemplary base station, such as base station 302 shown in FIG. 3. Base stations 304 and 308 may be implemented in s similar manner. As shown in FIG. 4, the base station 302 may include: a data processing system 408, which may include one or more microprocessors and/or one or more circuits, such as an application specific integrated circuit (ASIC), field-programmable gate arrays (FPGAs), and the like; a network interface 406 connected to network 306; and a data storage system 410, which may include one or more non-volatile storage devices and/or one or more volatile storage devices (e.g., random access memory (RAM)). The network interface 406 is connected to transceiver 404, which is configured to transmit and receive signals via one or more antennas 402 or on network 306. According to particular embodiments, the antennas may be configured to include one or more antenna ports. For instance, antenna 402 may include a first antenna port 0, and a second antenna port 1, which correspond to ports 0 and 1 of the LTE specification. In an exemplary embodiment of the disclosed devices and methods, the base station 402 is a Node B or Evolved Node B. According to certain aspects, the disclosed nodes may be macro, micro, pico, and femto nodes operational in a number of cell types and sizes. Cell size and type may include, for instance, very small, small, medium, large, very large, macro, very large macro, micro, pico and femto in accordance with the LTE specification.

In embodiments where data processing system 408 includes a microprocessor, computer readable program code may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 408 to perform steps described below (e.g., steps described below with reference to the flow chart shown in FIGS. 6, 7, and 9). In other embodiments, the base station 302 is configured to perform steps described herein without the need for code. That is, for example, data processing system 408 may consist merely of one or more ASICs. Hence, the features of the present invention described herein may be implemented in hardware and/or software. For example, in particular embodiments, the functional components of the base station described above may be implemented by data processing system 308 executing computer instructions, by data processing system 308 operating independent of any computer instructions, or by any suitable combination of hardware and/or software.

Figure 5:
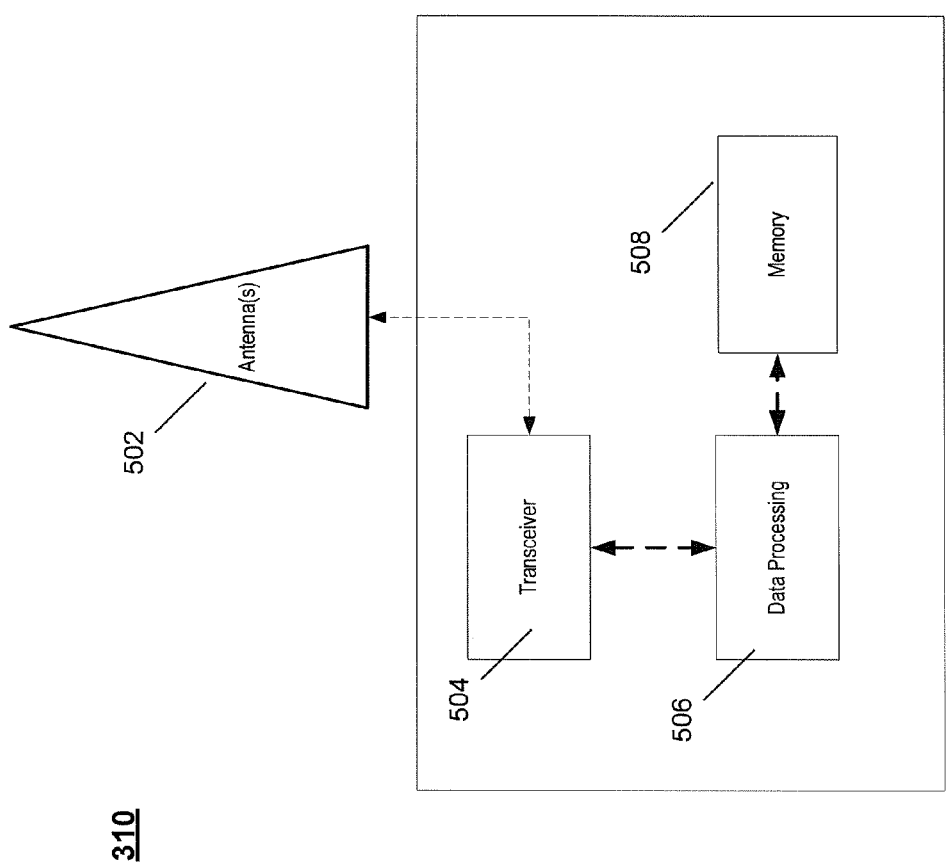
FIG. 5 is a block diagram of user equipment (UE) in accordance with exemplary embodiments of the present invention.

FIG. 5 illustrates a block diagram of an exemplary UE communication device, such as UE 310 shown in FIG. 3. As shown in FIG. 5, the UE communication device may include: one or more antennas 502, a data processing system 506, which may include one or more microprocessors and/or one or more circuits, such as an application specific integrated circuit (ASIC), field-programmable gate arrays (FPGAs), or the like, and a data storage or memory system 608, which may include one or more non-volatile storage devices and/or one or more volatile storage devices (e.g., random access memory (RAM)). The antennas 502 are connected to transceiver 504, which is configured to transmit and receive signals via the antennas 502.

In embodiments where data processing system 506 includes a microprocessor, computer readable program code may be stored in a computer readable medium, such as, but not limited to, magnetic media (e.g., a hard disk), optical media (e.g., a DVD), memory devices (e.g., random access memory), and the like. In some embodiments, computer readable program code is configured such that when executed by a processor, the code causes the data processing system 506 to perform steps related to measurement and/or reporting of certain values, including for instance, quality indicators and reference measurements. In other embodiments, the UE communication device 310 is configured to perform certain steps without the need for code. That is, for example, data processing system 506 may consist of one or more ASICs. Hence, the features of the present invention described herein may be implemented in hardware and/or software. For example, in particular embodiments, the functional components of the UE communication device 310 described above may be implemented by data processing system 506 executing computer instructions, by data processing system 506 operating independent of any computer instructions, or by any suitable combination of hardware and/or software.

In certain embodiments, the methods and devices described herein may be utilized, for instance, in heterogeneous network 300, which may employ the soft cell concept. UEs in network 300, such as UE 310 may benefit from data connections, for instance, between UE 310 and low power node 308, where the data connection is to a point 308 that is different than the bases station 302 transmitting control plane signals for the serving cell 312. According to aspects of the present invention, the handover decision process, and thus transmission quality in the network 300, is improved. The handover may be made and/or implemented by base station 302, but is based on (at least in part) the link quality between UE 310 and low power node 308.

Figure 6:
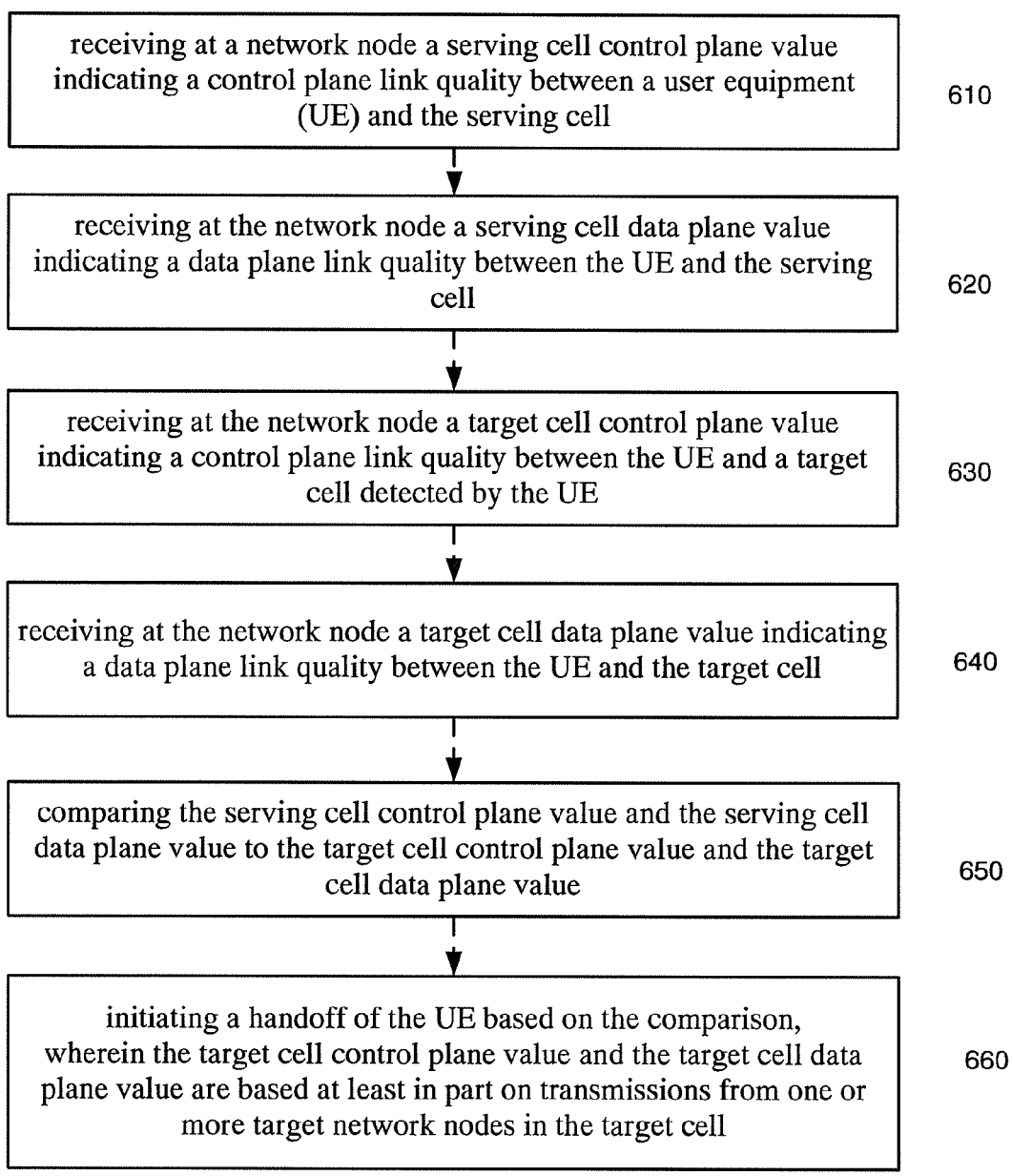
FIG. 6 is a flow chart illustrating a process for improving performance in a communication network in accordance with exemplary embodiments of the present invention.

Referring now to FIG. 6, a flow chart 600 illustrating a process for improving the quality of service in a communication network having a serving cell and a target cell is shown. In certain embodiments, the process 600 may be applied to handover decisions initiated in communication network 300. In this instance, UE 310 may be served by base station 302 in serving cell 312 at or near a cell edge to neighboring cell 314, which is served by base station 304. In order to improve or maintain the continuity of service to UE 310, it may be necessary for base station 302 to initiate a handoff of UE 310 from serving cell 312 to target cell 314. For instance, if UE 310 is moving or there has been a change in link quality.

In step 610, network node 302 receives a serving cell control plane value. The control plane may be understood as the plane providing downlink physical control channels, such as the physical channel downlink control signaling (PDCCH) and physical control format indicator channel (PCFICH). According to aspects of the embodiment, the control plane value received by network node 302 is a value indicative of the link quality between UE 310 and the serving cell 312 in the control plane. Values may be received directly from UE 310 or over the network 306, and may include, for example a report of Reference Signal Received Power (RSRP). Additional control plane values may include Received Signal Strength in the Primary Synchronization Signal (PSS), or Secondary Synchronization Signal (SSS).

In step 620, the network node 302 receives a serving cell data plane value. The data plane may be understood as the plane providing the downlink physical data channels, such as the physical downlink shared channel (PDSCH). According to aspects of the embodiment, the data plane value received by node 302 is a value indicative of the data plane link quality between the UE 310 and the serving cell 312. The data plane value may indicate the quality of the link between UE 310 and a low power node, such as point 308. Node 308 may be, for instance, a pico node providing data service in a limited coverage area 316 in a soft cell deployment.

Data plane values may be received directly from UE 310 or from node 304 via transmission or over the network 306, and may include, for example one or more measurements of a channel state information reference signal (CSI-RS), RSRP measurements, received signal reference quality (RSRQ) measurements, and channel quality indicator (CQI) estimates for feedback. For instance, the received data plane value may be calculated at node 302, or within backend network 306. The data plane value may also be determined by UE 310. These synchronization signals may represent any suitable signal received by the UE that is transmitted directly to node 302 or relayed via node 308. Data plane values may also include information based on synchronization signals received by the UE 310 and used to align the UE 310 with the wireless network 300 in time and/or frequency. Specific examples of synchronization signals that may be used in particular embodiments include the Primary Synchronization Signal (PSS) or any of the Secondary Synchronization Signals (SSSs) that are transmitted in each frame in LTE networks.

In step 630, the network node 302 receives a target cell control plane value indicating a control plane link quality between the UE 310 and the target cell 314, which has been detected by UE 310. According to certain embodiments, this value may include (or be based on) RSRP measured relative to target cell baste station 304. This value may be received by node 302 via antennas 402 of through network interface 406 from network 306. According to certain aspects, the value may be received directly from UE 310.

In step 640, the network node 302 receives a target cell data plane value indicating a data plane value link quality between the UE 310 and the target cell 314. According to certain aspects, the target cell control plane value and the target cell data plane value are based at least in part on transmission from one or more network nodes in the target cell, for instance, node 304 or additional low power nodes in cell 314. As with the serving cell and target cell data plane values, the target cell data plane values may be received directly from UE 310 or indirectly via network 306 or other sources communicating information in network 300.

In step 650, the serving cell control plane value and the serving cell data plane value are compared to the target cell control plane value and the target cell data plane value. For instance, a network node 302 or backend device may compare these values according to:

$$\alpha \cdot \text{ControlPlaneValue}_{Target} + \beta \cdot \text{DataPlaneValue}_{Target} >$$

$$\alpha \cdot \text{ControlPlaneValue}_{Serving} + \beta \cdot \text{DataPlaneValue}_{Serving} + \gamma \cdot X + \delta \cdot Y \quad (2)$$

where the terms X and Y represent values used to specify the ease or difficulty of entering or leaving a giving a cell. For example, the X term may be used to ensure that a minimum difference between the link quality in the serving and target cells must be met in order to initiate a handoff. This may prevent repeated and/or unwanted handovers between cells providing relatively similar quality. Further, the Y term may be used in certain embodiments to increase or decrease priority for a given cell, in order to obtain a desired load balance.

For instance, large values of X and Y could reduce the likelihood of a handover from cell 312 to 314 in the example network of FIG. 3.

According to certain embodiments, the terms X and Y may represent handover hysteresis and cell offset values, respectively. The weighting factors α, β, γ, and δ may be determined and set, for instance, by a network vendor or operator. Additionally, these values may be set or modified by one or more decisions made at the node 302. These value may range, for example, from 0 to 1. However, appropriate tuning may be utilized to balance and/or control the load of cells 312 and 314. The weighting factors and handover/offset margins may be signaled from the network to the users and nodes either in a generic, UE-specific, or cell-specific fashion.

According to certain embodiments, the weighting factors, hysteresis, and offset values may be set and/or modified based on numerous factors, including but not limited to user speed, cell size, the relative cell size of cells 312 and 314, user direction, cell load, and the characteristics of base stations 302, 304, and/or 308. Additionally, parameters may be set and/or modified on the basis of the type of service needed by the user. For example, for time critical services, such as video, or speech, a first set of parameters may be employed while a second set may be employed when a user is supporting a best effort service, such as the Internet or file transfer protocol (FTP).

In step 660, a handoff is initiated based, at least in part, on the comparison of step 550. According to certain embodiments, if the weighted sum of the control plane and data plane values of target cell 314 is greater than the sum of the control plane and data plane values of service cell 312 by a given margin (e.g., a hysteresis and cell offset margin), UE 310 will be attached to target cell 314. This handover may be seamless or lossless and may be initiated by base station 302.

In certain embodiments, the control plane values for the serving and target cell may be RSRP (or based on RSRP) while the data plane values are CQI estimates (or based on CQI estimates). Accordingly, a handover decision may be based on whether the following is satisfied:

$$\alpha \cdot RSRP_{Target} + \beta \cdot CQI_{Target} >$$

$$\alpha \cdot RSRP_{Serving} + \beta \cdot CQI_{Serving} + \gamma \cdot HO_{Hysteresis} + \delta \cdot CellOffset \quad (3)$$

where α, β, γ, and δ are weighting factors.

The expression of Equation (3) utilizes CQI to quantify the quality of the data plane link in both serving cell 312 and target cell 314. However, CSI feedback, or other quality measurements such as Signal to Interference Noise Ratio (SINR) could also be used for either or both of the data plane values. According to certain embodiments, these values of CQI and CSI can be measured directly by the serving base station 312 on certain physical resource blocks (RPBs), such as those used for the communication on UE 310. With respect to CQI, CSI measurements may be performed on the same PRBs where measurements are performed in the serving cell 312. Estimation of the CQI, can be done, for example, by measuring RSRP from the neighbor cell 314 as well as interference generated by the neighboring cell 314. According to certain embodiments, this value may be based on their ratio. Interference from the neighboring cell 314 may be given as the total received interference in these PRBs, minus the RSPR from the neighbor cell 314.

In certain embodiments, the data plane link quality is based on measurements on CSI-RS, including, e.g., RSRP measurements, RSRQ measurements and CQI estimates for feedback. The data plane link quality may further be based on the signal strength received on the primary and/or secondary synchronization channels (PSS and SSS respectively). According to further aspects, the quality of the link in data plane (i.e., user plane) can be measured in terms of CQI, CSI, or an equivalent. These values may be used, for example, in the expression of Equation (2) for DataPlaneValue$_{Target}$ and DataPlaneValue$_{Serving}$.

In certain embodiments, the absolute level of RSRP in the serving cell 312 is considered as part of the handover decision. For instance, if the RSRP from the serving cell 312 is below a given threshold, for instance, the threshold defined by the event A2 in §5.5.4. of 3GPP 36.331, then a handover from serving cell 312 may be triggered. For example, the network may require that that UE 310 be attached to the neighboring (target) cell with the highest RSRP, such as cell 314. According to certain embodiments, a handover may be triggered even though the conditions expressed, for instance, by Equation (2), are not satisfied. However, if the connection quality from the serving cell is sufficient to maintain connection (i.e., there is no immediate risk of radio link failure), a handover decision may be based on an evaluation of the relative link quality between neighboring cells, for instance, based on the process 600. Accordingly, a threshold may be defined to indicate an acceptable risk of radio link failure.

Figure 7:
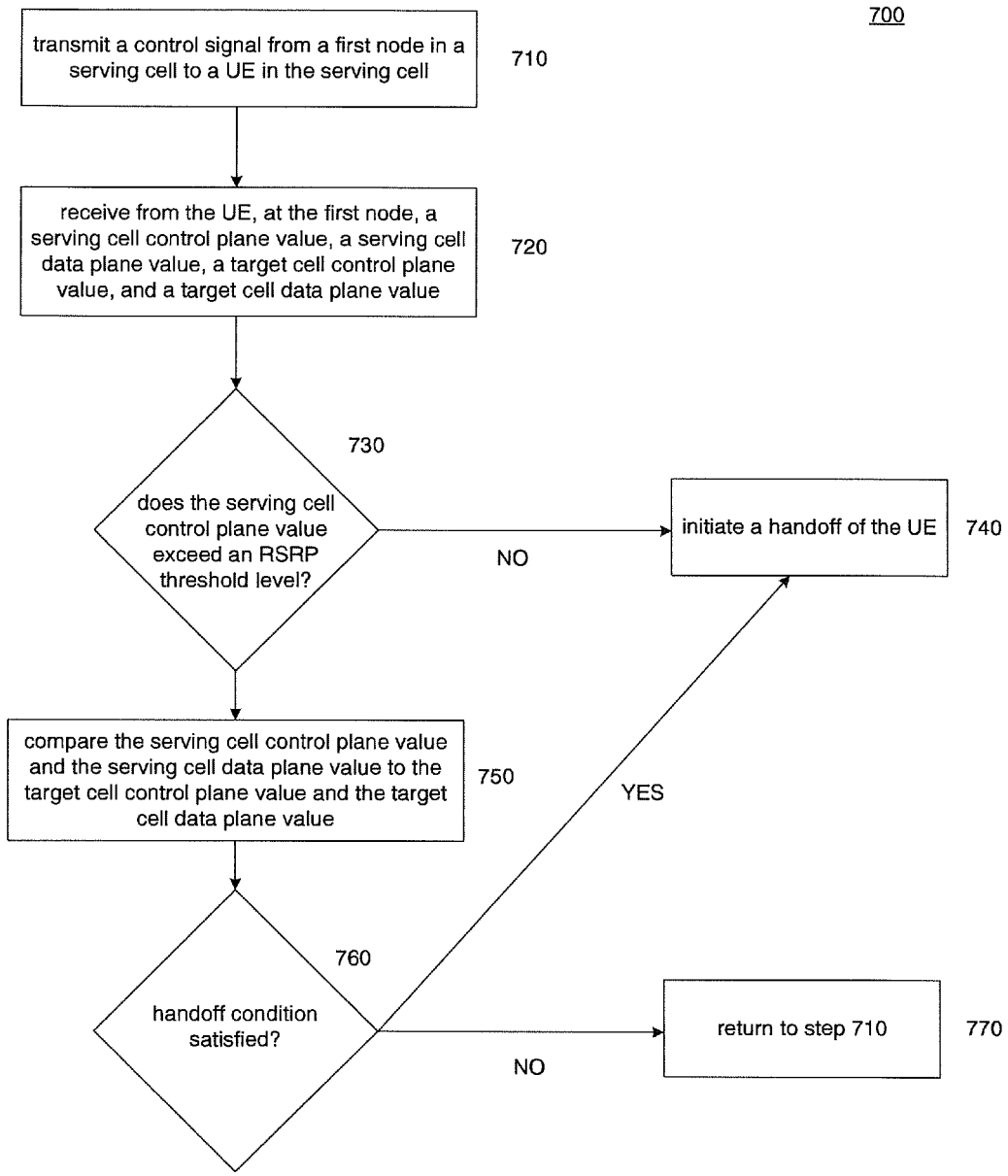
FIG. 7 is a flow chart illustrating a process for improving performance in a communication network in accordance with exemplary embodiments of the present invention.

Referring now to FIG. 7, a process 700 for making a handover decision in a communication network having a serving cell and a target cell is shown. For instance, process 700 may be applied to UE 310 in network 300 having serving cell 312 and target cell 314. According to certain embodiments, process 700 may be applied to heterogeneous networks featuring a variant of the soft cell concept, where the down link signaling and Cell Specific Reference Symbols are transmitted by a macro base station, such as node 302, and data is transmitted from a low power node, such as pico 308, or from a combination of nodes 308 and 302, for instance, for different data flows.

In step 710, control signals are transmitted from a first node of the network. For instance, from base station 302. These signals are received by one or more UEs in the base station's serving cell 312, such as UE 310. According to aspects of the present invention, these signals are transmitted in the control plane. Additional signaling may be transmitted in the data plane, for instance, by base station 302 or a lower power node such as point 308.

In step 720, the base station 302 receives a number of values indicating link quality for UE 310. These values include a serving cell control plane value and a serving cell data plane value, which indicate the link quality for the UE 310 of its serving cell. According to certain embodiments, at least one of these values is based on measurements by UE 310 of one or more signals transmitted by base station 302 in step 710.

The values received in step 720 also include a target cell control plane value and a target cell data plane value. These values indicate the link quality between UE 310 and a neighboring cell, such as target cell 314. According to certain embodiments, these values are based on measurements by UE 310 of signals transmitted from one or more base stations in cell 314, such as base station 304.

In step 730, a determination is made as to whether the serving cell control plane value exceeds a given threshold. According to certain embodiments, this determination is made by evaluating whether the RSRP reported by UE 310 for serving cell 312 exceeds a given threshold. If not, a handoff is initiated to a neighboring cell in step 740. For example, the UE 310 may be attached to the neighboring cell with the highest RSRP, which may be target cell 314. This decision may be made prior to receipt and evaluation of the remaining signals of step 720.

If the threshold is met, the process proceeds to step 750, and the serving cell control plane value and the service data plane value are compared to the data plane value and the control plane value of the target cell. If a handoff condition is satisfied, the process proceeds to step 740 and the UE is attached to target cell 314. Otherwise, the process returns to step 710.

According to certain embodiments, the comparison and handoff decision of steps 750 and 760 may be made in accordance with the process 600 shown in FIG. 6. For instance, the comparison of step 750 may utilize Equation (2) described above.

Figure 8:
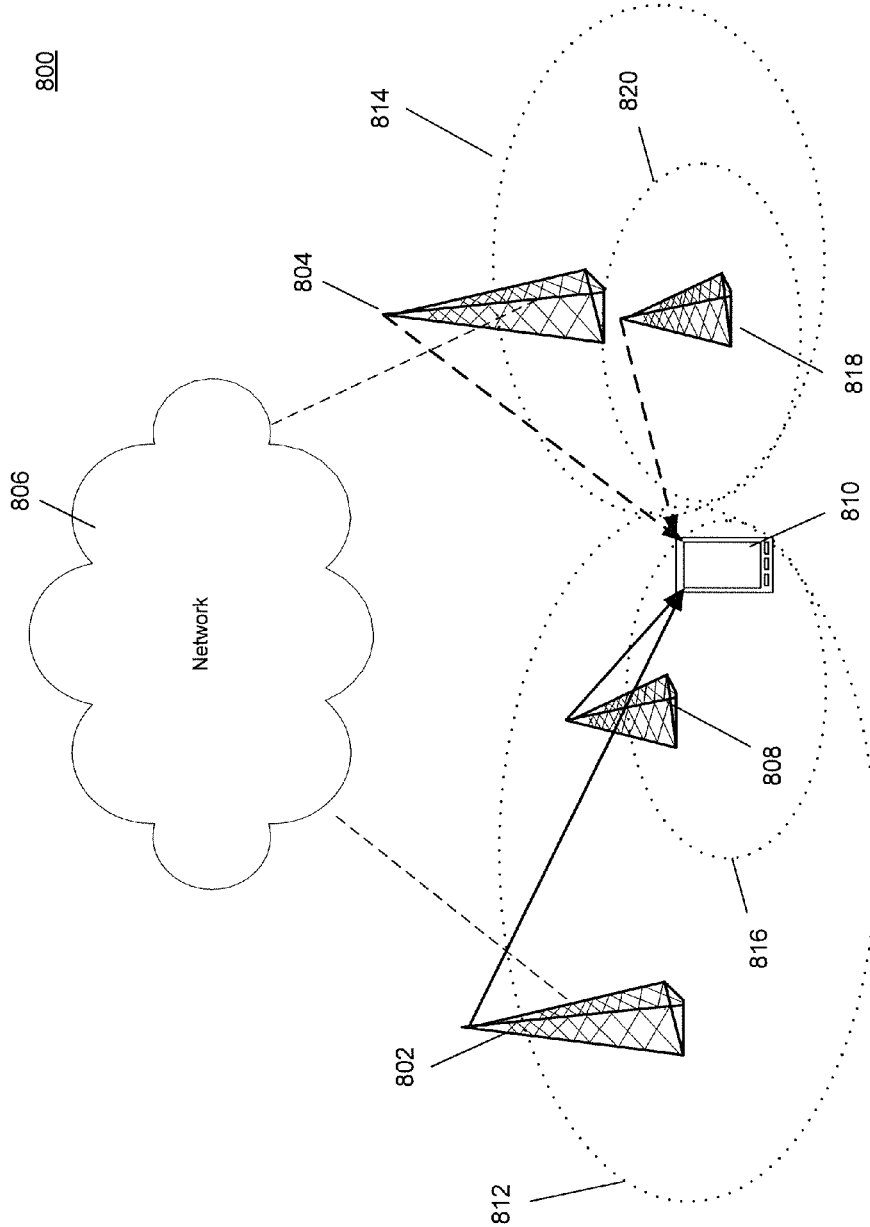
FIG. 8 is an illustration of a wireless communication system in accordance with exemplary embodiments of the present invention.

With reference to FIG. 8, a communication network 800 is provided that includes two macro nodes 802, 804 and two low power nodes 808,818. Serving cell nodes 802 and 808 are located within serving cell 812 and provide service to UE 810, while target cell nodes 804 and 818 are located within target cell 814. Low power nodes 808 and 818 have coverage areas 816 and 820. These coverage areas may define, for example, the geographic regions where a UE, such as UE 810, can transmit data via an uplink connection to the low power nodes. The communication network also includes network 806, which may, for instance, connect nodes 802 and 804, 802 and 808, and 804 to 818.

One or more of the cells 812,814 may be heterogeneous deployments having macro base stations 802, 804 and pico or femto nodes 808,818 in a soft cell configuration. In certain embodiments, the low power node 818 with coverage area 820 may be located near the border between serving cell 812 and target cell 814. As the UE 810 approaches the border between serving cell 812 and target cell 814, or if link quality conditions change, it may improve service to handover UE 810 from serving cell 812 to target cell 814. The decision whether or not to initiate the handoff may be based, at least in part, on the quality of the data plane link between UE 810 and one or more of the low power nodes 808 and 818. The link quality may be indicated, for instance, by one or more uplink measurements.

Figure 9:
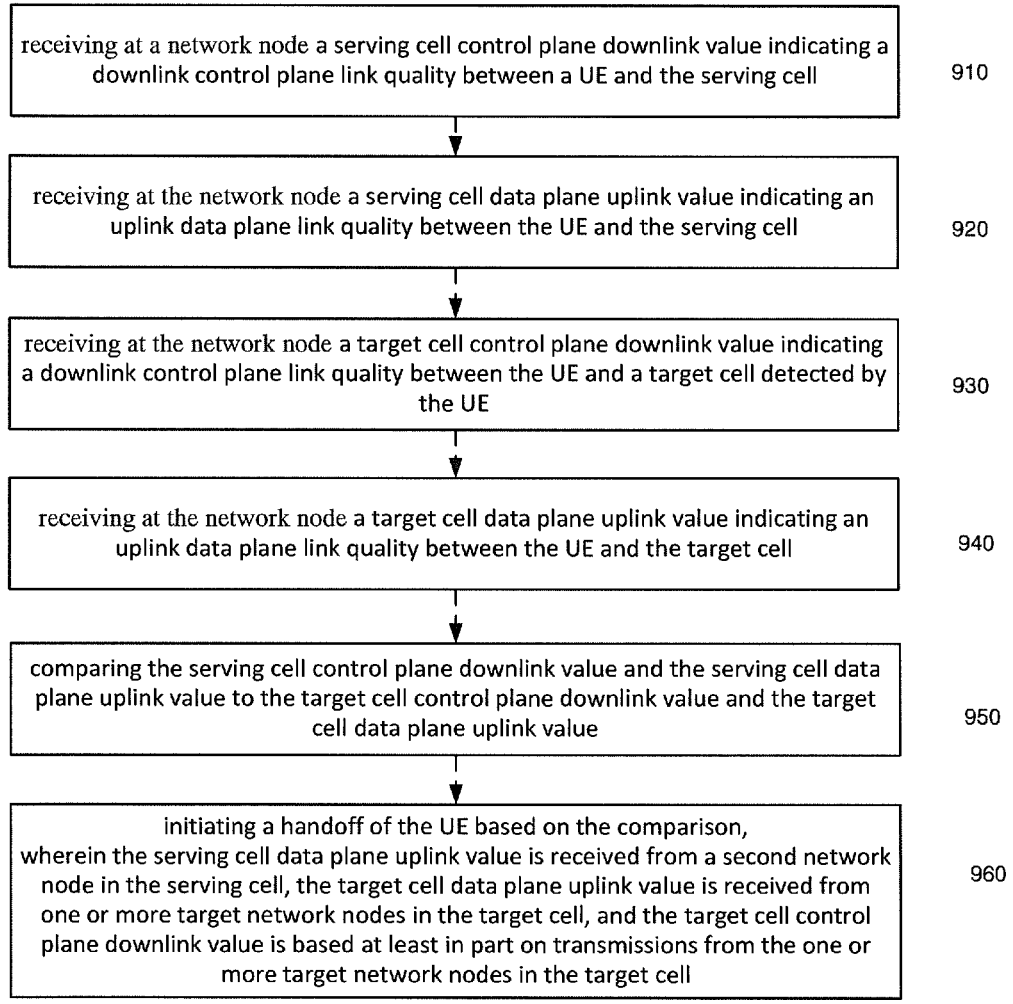
FIG. 9 is a flow chart illustrating a process for improving performance in a communication network in accordance with exemplary embodiments of the present invention.

Referring now to FIG. 9, a flow chart 900 illustrates a process for determining whether or not to initiate a handoff in a communications network.

In step 910, a network node, such as base station 802 in FIG. 8, receives one or more serving cell control plane downlink values that indicate the downlink control plane quality between a UE and the serving cell. For instance, base station 802 may receive a value from UE 810 indicating the link quality between UE and serving cell 812. These values may be received directly from UE 810, or indirectly, for instance, over the network 806. According to certain embodiments, a received serving cell control plane downlink value may be based on an RSRP report transmitted by a UE in serving cell 812, such as UE 810.

In step 920, the network node receives an indication of the uplink quality in the data plane for a UE within serving cell 812. For instance, base station 802 may receive a serving cell data plane uplink value that indicates the link quality between UE 810 and a node providing service on the data plane, such as low power node 808 in a soft cell configuration. The serving cell data plane uplink value may be received from low power node 808, for instance via network 806 or an over-air connection. This value may be based on, for example, measurements performed at low power node 808.

Additionally, the serving cell data plane uplink value may be received directly from UE 810 or from another source within a backend system of communication network 800. Alternatively, in step 920, the node, such as base station 802, may measure one or more signals transmitted by UE 810 in order to determine the link quality on the data plane in serving cell 812. This measurement may include, for example Uplink Sounding Reference Symbols (UL SRS), UL demodulation reference symbols, received signal strength in Physical Uplink Control Channel (PUCCH).

In step 930, the network node receives a target cell control plane downlink value indicating a downlink control plane link quality between UE 810 and target cell 814. According to certain embodiments, this value may include (or be based on) RSRP measured relative to target cell baste station 804. This value may be received by node 802 via antennas 402 or through network interface 406 from network 806. According to certain embodiments, the value may be received directly from UE 810.

In step 940, the network node receives a target cell data plane uplink value indicating an uplink data plane link quality between UE 810 and target cell 814. According to certain embodiments, the target cell data plane uplink value may indicate the link quality between UE 810 and one or more low power nodes in target cell 814 near the cell edge, such as node 818 in FIG. 8. For instance, when target cell 814 employs the soft cell concept, low power node 818 provides data coverage in region 820.

According to certain embodiments, the serving cell and target cell uplink data plane values may be based on measurements of uplink sounding reference signals (SRS) or uplink signal to interference to noise ratios (SINR). These values may be measured, for instance, by low power nodes 808 and 818.

In step 950, the serving cell control plane downlink value and the serving cell data plane uplink value are compared to the target cell control plane downlink value and the target cell data plane uplink value. This comparison may be performed, for example, by base station 802 and in accordance with Equation (2) as discussed above with respect to process 600.

In step 960, a handoff is initiated based, at least in part, on the comparison of step 950. This handoff may be initiated, for instance, by macro base station 802 in serving cell 812 to macro base station 804 in serving cell 814.

According to certain embodiments of the present invention, one or more link quality values are communicated via a backhaul interconnecting nodes in serving and target cells 312, 314, 812, and 814. For instance one or more of macro nodes 802,804 and lower power nodes 808,818 may be connected via network 806. In certain aspects, if the backhaul network is not sufficiently fast to effectively communicate necessary information, the following comparison may be employed when determining whether or not to initiate a handoff:

$$\beta \cdot RSRP_{Target} > RSRP_{Serving} + HO_{Hysteresis} + CellOffset \qquad (4)$$

where the values of weighting factor $\beta$, $H_{Hysteresis}$, and CellOffset may be determined as discussed with respect to Equation (2) and process 600.

It will be readily apparent to one of ordinary skill in the art that the concepts described herein may be further applied to any heterogeneous system with an imbalance, such as an imbalance between the data plane (user plane) and the control plane, an imbalance between uplink and downlink characteristics, or a combination of both.

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A method for improving the quality of service in a communication network having a serving cell and a target cell, comprising:
    receiving at a first network node:
        a serving cell control plane value indicating a control plane link quality between a user equipment (UE) and the serving cell,
        a serving cell data plane value indicating a data plane link quality between the UE and the serving cell,
        a target cell control plane value indicating a control plane link quality between the UE and a target cell detected by the UE, and
        a target cell data plane value indicating a data plane link quality between the UE and the target cell;
    comparing said serving cell control plane value and said serving cell data plane value to said target cell control plane value and said target cell data plane value; and
    initiating a handoff of said UE based on said comparison, wherein said target cell control plane value and said target cell data plane value are based at least in part on transmissions from one or more target network nodes in said target cell.

2. The method of claim 1, wherein said serving cell control plane value and said target cell control plane value are based on one or more reference signal received power (RSRP) measurements by said UE.

3. The method of claim 2, further comprising:
    determining whether said serving cell control plane value exceeds an RSRP threshold level, and
    wherein said initiating step is based at least in part on said determination that said serving cell control plane value exceeds said RSRP threshold level.

4. The method of claim 3, wherein said first network node initiates a handoff of said UE if said serving cell control plane value is less than said RSRP threshold level.

5. The method of claim 1, wherein at least one of said serving cell data plane value and said target cell data plane value are based on at least one of measurements of a channel state information reference signal (CSI-RS), reference signal received power (RSRP) measurements, received signal reference quality (RSRQ) measurements, and channel quality indicator (CQI) estimates for feedback.

6. The method of claim 1, wherein at least one of said serving cell data plane value and said target cell data plane value are based on measurements of a synchronization signal.

7. The method of claim 1, wherein said serving cell control plane value, said serving cell data plane value, said target cell control plane value, and said target cell data plane value are received from said UE.

8. The method of claim 1, wherein said handoff is initiated if said comparing step indicates that:

$$\alpha \cdot \text{ControlPlaneValue}_{Target} + \beta \cdot \text{DataPlaneValue}_{Target} > \alpha \cdot \text{ControlPlaneValue}_{Serving} + \beta \cdot \text{DataPlaneValue}_{Serving} + \gamma \cdot X + \delta \cdot Y,$$

where $\alpha$, $\beta$, $\gamma$, and $\delta$ are handover weighting factors, ControlPlaneValue$_{Target}$ is said target cell control plane value, ControlPlaneValue$_{Serving}$ is said serving cell control plane value, DataPlaneValue$_{Target}$ is said target cell data plane value, DataPlaneValue$_{Serving}$ is said serving cell data plane value, and X and Y are handover values.

9. The method of claim 8, wherein said handover value X is a handover hysteresis value and said handover value Y is a cell specific offset value.

10. The method of claim 8, wherein said handover weighting factor $\alpha$ is greater than or equal to said handover weighting factor $\beta$.

11. The method of claim 8, wherein said handover weighting factor $\alpha$ is less than said handover weighting factor $\beta$.

12. The method of claim 8, wherein said handover weighting factors range from 0 to 1.

13. The method of claim 1, wherein said serving cell is a soft cell and includes a second network node, and
    said serving cell data plane value is based on a data signal transmitted by said second network node.

14. The method of claim 1 wherein said one or more target network nodes includes a first target network node and a second target network node,
    said target cell control plane value is based on a signal transmitted by said first target network node, and
    said target cell data plane value is based on a data signal transmitted by said second target network node.

15. A method for improving the quality of service in a communication network having a serving cell and a target cell, comprising:
    receiving at a first network node:
        a serving cell control plane downlink value indicating a downlink control plane link quality between a user equipment (UE) and the serving cell,
        a serving cell data plane uplink value indicating an uplink data plane link quality between the UE and the serving cell,
        a target cell control plane downlink value indicating a downlink control plane link quality between the UE and a target cell detected by the UE, and
        a target cell data plane uplink value indicating an uplink data plane link quality between the UE and the target cell;
    determining at said first network node a serving cell data plane uplink value indicating an uplink data plane link quality between the UE and the serving cell,
    comparing said serving cell control plane downlink value and said serving cell data plane uplink value to said target cell control plane downlink value and said target cell data plane uplink value; and
    initiating a handoff of said UE based on said comparison, wherein said serving cell data plane uplink value is received from a second network node in said serving cell, said target cell data plane uplink value is received from one or more target network nodes in said target cell, and said target cell control plane downlink value is based at least in part on transmissions from said one or more target network nodes in said target cell.

16. The method of claim 15, wherein said serving cell data plane uplink value is determined based on a received uplink sounding reference signal (SRS) or uplink signal to interference to noise ratio (SINR).

17. The method of claim 15, wherein said serving cell control plane downlink value and said target cell control plane downlink value are based on one or more reference signal received power (RSRP) measurements by said UE.

18. The method of claim 15, wherein said handoff is initiated if said comparing step indicates that:

$$\alpha \cdot \text{ControlPlaneValue}_{Target} + \beta \cdot \text{DataPlaneValue}_{Target} > \alpha \cdot \text{ControlPlaneValue}_{Serving} + \beta \cdot \text{DataPlaneValue}_{Serving} + \gamma \cdot X + \delta \cdot Y,$$

where $\alpha$, $\beta$, $\gamma$, and $\delta$ are handover weighting factors, ControlPlaneValue$_{Target}$ is said target cell control plane downlink value, ControlPlaneValue$_{Serving}$ is said serving cell control plane downlink value, DataPlaneValue$_{Target}$ is said target cell data plane uplink value, DataPlaneValue$_{Serving}$ is said serving cell data plane uplink value, and X and Y are handover values.

19. The method of claim 18, wherein said handover value X is a handover hysteresis value and said handover value Y is a cell specific offset value.

20. The method of claim 18, wherein said handover weighting factor $\alpha$ is greater than or equal to said handover weighting factor $\beta$.

21. The method of claim 18, wherein said handover weighting factor $\alpha$ is less than said handover weighting factor $\beta$.

22. The method of claim 18, wherein said handover weighting factors range from 0 to 1.

23. A network node operable in a communication network having a serving cell and a target cell, comprising:
  a receiver configured to receive:
    a serving cell control plane value indicating a control plane link quality between a user equipment (UE) and the serving cell,
    a serving cell data plane value indicating a data plane link quality between the UE and the serving cell,
    a target cell control plane value indicating a control plane link quality between the UE and a target cell detected by the UE, and
    a target cell data plane value indicating a data plane link quality between the UE and the target cell; and
  a processor configured to:
    compare said serving cell control plane value and said serving cell data plane value to said target cell control plane value and said target cell data plane value; and
    initiate a handoff of said UE based on said comparison,
  wherein said target cell control plane value and said target cell data plane value are based at least in part on transmissions from one or more target network nodes in said target cell and said network node is located within said serving cell.

24. The network node of claim 23, wherein said serving cell control plane value and said target cell control plane value are based on one or more reference signal received power (RSRP) measurements by said UE.

25. The network node of claim 24, wherein said processor is further configured to:
  determine whether said serving cell control plane value exceeds an RSRP threshold level, and
  initiate a handoff of said UE if said serving cell control plane value is less than said RSRP threshold level.

26. The network node of claim 23, wherein at least one of said serving cell data plane value and said target cell data plane value are based on at least on of measurements of a channel state information reference signal (CSI-RS), reference signal received power (RSRP) measurements, received signal reference quality (RSRQ) measurements, and channel quality indicator (CQI) estimates for feedback.

27. The network node of claim 23, wherein at least one of said serving cell data plane value and said target cell data plane value are based on measurements of a synchronization signal.

28. The network node of claim 23, wherein said serving cell control plane value, said serving cell data plane value, said target cell control plane value, and said target cell data plane value are received from said UE.

29. The network node of claim 23, wherein said processor is configured to initiate a handoff if:

$$\alpha \cdot \text{ControlPlaneValue}_{Target} + \beta \cdot \text{DataPlaneValue}_{Target} > \alpha \cdot \text{ControlPlaneValue}_{Serving} + \beta \cdot \text{DataPlaneValue}_{Serving} + \gamma \cdot X + \delta \cdot Y,$$

where $\alpha$, $\beta$, $\gamma$, and $\delta$ are handover weighting factors, ControlPlaneValue$_{Target}$ is said target cell control plane value, ControlPlaneValue$_{Serving}$ is said serving cell control plane value, DataPlaneValue$_{Target}$ is said target cell data plane value, DataPlaneValue$_{Serving}$ is said serving cell data plane value, and X and Y are handover values.

30. The network node of claim 29, wherein said handover value X is a handover hysteresis value and said handover value Y is a cell specific offset value.

31. The network node of claim 29, wherein said handover weighting factor $\alpha$ is greater than or equal to said handover weighting factor $\beta$.

32. The network node of claim 29, wherein said handover weighting factor $\alpha$ is less than said handover weighting factor $\beta$.

33. The network node of claim 29, wherein said handover weighting factors range from 0 to 1.

34. The network node of claim 23, wherein said serving cell is a soft cell and includes a second network node, and
  said serving cell data plane value is based on a data signal transmitted by said second network node.

35. The network node of claim 23, wherein said one or more target network nodes includes a first target network node and a second target network node,
  said target cell control plane value is based on a signal transmitted by said first target network node, and
  said target cell data plane value is based on a data signal transmitted by said second target network node.

36. A network node operable in a communication network having a serving cell and a target cell, comprising:
  a receiver configured to receive:
    a serving cell control plane downlink value indicating a downlink control plane link quality between a user equipment (UE) and the serving cell,
    a serving cell data plane uplink value indicating an uplink data plane link quality between the UE and the serving cell,
    a target cell control plane downlink value indicating a downlink control plane link quality between the UE and a target cell detected by the UE, and
    a target cell data plane uplink value indicating an uplink data plane link quality between the UE and the target cell;
  a processor configured to:
  compare said serving cell control plane downlink value and said serving cell data plane uplink value to said target cell control plane downlink value and said target cell data plane uplink value; and
  initiate a handoff of said UE based on said comparison,
  wherein said network node is located in said serving cell, said serving cell data plane uplink value is received from a second network node in said serving cell, said target cell data plane uplink value is received from one or more target network nodes in said target cell, and said target cell control plane downlink value is based at least in part on transmissions from said one or more target network nodes in said target cell.

37. The network node of claim 36, wherein said target cell data plane uplink value and said serving cell data plane uplink value are uplink sounding reference signal (SRS) values or uplink signal to interference to noise ratios (SINR).

38. The network node of claim 36, wherein said serving cell control plane downlink value and said target cell control plane downlink value are based on one or more reference signal received power (RSRP) measurements by said UE.

39. The network node of claim 36, wherein said processor is configured to initiate a handoff if:

$$\alpha \cdot \text{ControlPlaneValue}_{Target} + \beta \cdot \text{DataPlaneValue}_{Target} > \alpha \cdot \text{ControlPlaneValue}_{Serving} + \beta \cdot \text{DataPlaneValue}_{Serving} + \gamma \cdot X + \delta \cdot Y,$$

where $\alpha$, $\beta$, $\gamma$, and $\delta$ are handover weighting factors, $\text{ControlPlaneValue}_{Target}$ is said target cell control plane downlink value, $\text{ControlPlaneValue}_{Serving}$ is said serving cell control plane downlink value, $\text{DataPlaneValue}_{Target}$ is said target cell data plane uplink value, $\text{DataPlaneValue}_{Serving}$ is said serving cell data plane uplink value, and X and Y are handover values.

40. The network node of claim 39, wherein said handover value X is a handover hysteresis value and said handover value Y is a cell specific offset value.

41. The network node of claim 39, wherein said handover weighting factor $\alpha$ is greater than or equal to said handover weighting factor $\beta$.

42. The network node of claim 39, wherein said handover weighting factor $\alpha$ is less than said handover weighting factor $\beta$.

43. The network node of claim 39, wherein said handover weighting factors range from 0 to 1.

* * * * *

UNITED STATES PATENT AND TRADEMARK OFFICE
CERTIFICATE OF CORRECTION

| | | |
|---|---|---|
| PATENT NO. | : 8,837,290 B2 | Page 1 of 1 |
| APPLICATION NO. | : 13/705007 | |
| DATED | : September 16, 2014 | |
| INVENTOR(S) | : Dimou et al. | |

It is certified that error appears in the above-identified patent and that said Letters Patent is hereby corrected as shown below:

In The Claims

In Column 15, Line 59, in Claim 26, delete "at least on of" and insert -- at least one of --, therefor.

Signed and Sealed this
Twenty-eighth Day of April, 2015

Michelle K. Lee
*Director of the United States Patent and Trademark Office*